United States Patent
Roncaglia et al.

(10) Patent No.: US 8,677,846 B2
(45) Date of Patent: Mar. 25, 2014

(54) MECHANICAL GEARBOX FOR MOTOR VEHICLES

(75) Inventors: Roberto Roncaglia, Pozza Di Maranello (IT); Mauro Rioli, Sassuolo (IT)

(73) Assignee: Ferrari S.p.A. (IT)

( * ) Notice: Subject to any disclaimer, the term of this patent is extended or adjusted under 35 U.S.C. 154(b) by 471 days.

(21) Appl. No.: 12/668,620

(22) PCT Filed: Jul. 10, 2008

(86) PCT No.: PCT/IB2008/001805
§ 371 (c)(1),
(2), (4) Date: Jun. 22, 2010

(87) PCT Pub. No.: WO2009/007833
PCT Pub. Date: Jan. 15, 2009

(65) Prior Publication Data
US 2010/0257968 A1    Oct. 14, 2010

(30) Foreign Application Priority Data

Jul. 11, 2007    (IT) ................................ BO07A0473

(51) Int. Cl.
*F16H 3/38* (2006.01)

(52) U.S. Cl.
USPC ............................................. 74/339; 74/343

(58) Field of Classification Search
USPC .................... 74/339, 340, 345, 343
See application file for complete search history.

(56) References Cited

U.S. PATENT DOCUMENTS

| | | | | |
|---|---|---|---|---|
| 2,857,772 A | * | 10/1958 | Garnier et al. | 74/359 |
| 4,565,106 A | * | 1/1986 | Sumiyoshi | 74/359 |
| 4,833,933 A | * | 5/1989 | Lomas et al. | 74/359 |
| 4,986,142 A | * | 1/1991 | Borodin et al. | 74/473.19 |

(Continued)

FOREIGN PATENT DOCUMENTS

| | | |
|---|---|---|
| DE | 10011271 A1 | 9/2001 |
| DE | 10340149 A1 | 4/2005 |

(Continued)

OTHER PUBLICATIONS

"European Application Serial No. 11151054.1, Official Action mailed Apr. 26, 2011", 8 pgs.

(Continued)

*Primary Examiner* — Troy Chambers
*Assistant Examiner* — Alexander Vu
(74) *Attorney, Agent, or Firm* — Schwegman Lundberg & Woessner, P.A.

(57) ABSTRACT

A mechanical gearbox for motor vehicles presenting: a first shaft; a second shaft; a plurality of gear pairs, each of which mechanically couples the first shaft to the second shaft, defines a corresponding speed and comprises a first gear mounted on the first shaft and a second gear which is mounted on the second shaft and permanently meshes with the first gear; a plurality of synchronizers, each of which is mounted coaxially to a shaft between two gears of two gear pairs and is adapted to be actuated to alternatively engage the two gears to the shaft; and an actuation system for displacing each synchronizer alternatively in the two senses along the respective shaft and comprising a plurality of forks, each of which envelops a corresponding synchronizer; the gear pair of two consecutive speeds are arranged so as to be engaged by two different synchronizers; and the actuation system independently actuates the synchronizers.

10 Claims, 5 Drawing Sheets

(56) References Cited

U.S. PATENT DOCUMENTS

| | | | | |
|---|---|---|---|---|
| 5,105,902 | A * | 4/1992 | Wilson et al. | 180/247 |
| 5,888,165 | A * | 3/1999 | Besler et al. | 475/204 |
| 5,910,067 | A * | 6/1999 | Vandendriessche et al. | 477/92 |
| 6,604,438 | B2 * | 8/2003 | Ruhle et al. | 74/335 |
| 6,799,484 | B2 | 10/2004 | Gumpoltsberger et al. | |
| 7,037,237 | B2 * | 5/2006 | Sakamoto et al. | 477/77 |
| 7,093,511 | B2 * | 8/2006 | Norum et al. | 74/335 |
| 2001/0011484 | A1 * | 8/2001 | Ruhle et al. | 74/335 |
| 2001/0022245 | A1 * | 9/2001 | Rogg | 180/65.2 |
| 2004/0192499 | A1 * | 9/2004 | Sakamoto et al. | 477/98 |
| 2005/0016306 | A1 * | 1/2005 | Ruhle et al. | 74/335 |
| 2006/0037422 | A1 * | 2/2006 | Kuhstrebe et al. | 74/340 |
| 2010/0257968 | A1 * | 10/2010 | Roncaglia et al. | 74/339 |

FOREIGN PATENT DOCUMENTS

| | | | |
|---|---|---|---|
| EP | 1031769 A1 | 8/2000 | |
| EP | 1072823 A1 | 1/2001 | |
| EP | 1279869 A2 | 1/2003 | |
| FR | 2810713 A1 | 12/2001 | |
| JP | 4-19462 A | 1/1992 | |
| WO | WO-2006/123166 A2 | 11/2006 | |
| WO | WO 2006123166 A2 * | 11/2006 | F16D 11/10 |

OTHER PUBLICATIONS

"International Application Serial No. PCT/IB2008/001805, International Search Report mailed Apr. 8, 2009", 7 pgs.

"International Application Serial No. PCT/IB2008/001805, Written Opinion mailed Apr. 8, 2009", 8 pgs.

* cited by examiner

MECHANICAL GEARBOX FOR MOTOR VEHICLES

RELATED APPLICATIONS

This application is a nationalization under 35 U.S.C. 371 of PCT/IB2008/001805, filed Jul. 10, 2008 and published as WO 2009/007833 on Jan. 15, 2009, which claimed priority under 35 U.S.C. 119 to Italian Patent Application Serial No. BO2007A000473, filed Jul. 11, 2007; which applications and publication are incorporated herein by reference and made a part hereof.

TECHNICAL FIELD

The present invention relates to a mechanical gearbox for motor vehicles.

BACKGROUND

A mechanical gearbox comprises a primary shaft which receives motion from a crankshaft of a thermal engine of the vehicle by means of the interposition of a clutch, and a secondary shaft which transmits the motion to the drive wheels of the vehicle. The primary shaft and the secondary shaft are reciprocally and mechanically coupled by means of a plurality of gear pairs, each of which defines a corresponding speed and a comprises a primary gear mounted on the primary shaft and a secondary gear mounted on the secondary shaft.

According to a first possible embodiment, in each gear pair which defines a corresponding speed, the primary gear permanently meshes with the corresponding secondary gear; furthermore, in each gear pair, one gear is rigidly mounted onto its shaft, while the other gear is idly mounted on its shaft and coupled with a synchronizer adapted to be actuated to engage the other gear itself to its shaft (i.e. to make the gear integral with the shaft).

In order to reduce the number of gearbox components, each synchronizer is coaxially mounted with respect to a shaft between two gears so as either to be displaced in one sense to engage a gear onto the shaft or to be displaced in the other sense to engage the other gear onto the shaft. A plurality of forks are provided in order to actuate the synchronizers, which forks envelop a corresponding synchronizer to alternatively displace the synchronizer itself in the two senses along the shaft.

During a gear shift, once the clutch has been opened to disconnect the primary shaft from the crankshaft, the synchronizer of the gear of the current speed is actuated to disengage the gear of the current speed from the shaft, and thus the synchronizer of the gear of the subsequent speed is actuated to engage the gear of the subsequent speed onto the shaft. In a currently marketed mechanical gearbox, the gear pairs corresponding to consecutive speeds are arranged reciprocally side-by-side and share a same synchronizer; thus frequently a same synchronizer must be activated both to disengage the gear of the current speed from the shaft and to engage the gear of the subsequent speed onto the shaft. However, in this case, the gear shift is relatively slow because before starting to engage the gear of the subsequent speed onto the shaft it is necessary to wait for the gear of the current speed to be fully disengaged from the shaft.

SUMMARY

Examples of the present subject matter provide a mechanical gearbox for motor vehicles which is free from the above-described drawbacks and which is, at the same time, easy and cost-effective to make and which, specifically, allows to very fast gear shifts.

According to the present subject matter, a mechanical gearbox for motor vehicles is made as established in the accompanying claims.

BRIEF DESCRIPTION OF THE DRAWINGS

The present invention will now be described with reference to the accompanying drawings, which set forth some non-limitative embodiments thereof, in which.

DETAILED DESCRIPTION

Figure 1:
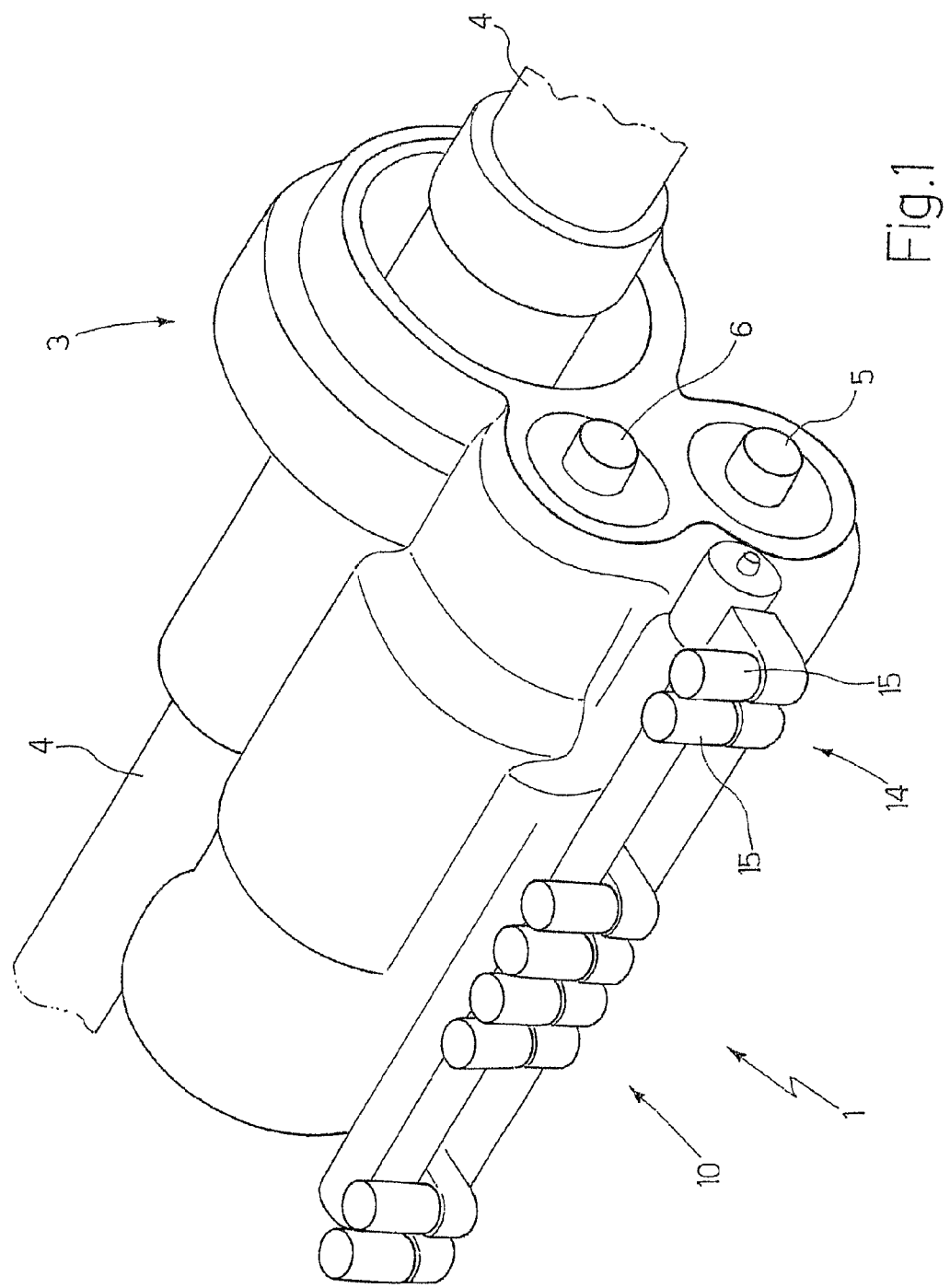
FIG. 1 is a perspective, diagrammatic view, with parts removed for clarity, of a mechanical gearbox made according to the present subject matter.

In FIG. 1, numeral 1 indicates as a whole a mechanical gearbox 1 for a vehicle adapted to receive motion from a thermal engine (not shown) of the vehicle by means of a propeller shaft 2 (shown in FIG. 4), which is mechanically connected to an engine shaft of the thermal engine by means of a clutch (not shown). Furthermore, the mechanical gearbox 1 is adapted to transmit the motion to the drive wheels (not shown) of the vehicle by means of a differential 3 from which a pair of drive axles 4 depart, each of which is integral with a corresponding drive wheel. The mechanical gearbox 1 shown in the attached figures presents eight speeds in total: one reverse (indicated hereinafter by letter R) and seven forward gears from the first to the seventh (indicated hereinafter by Roman numerals I to VII).

Figure 2:
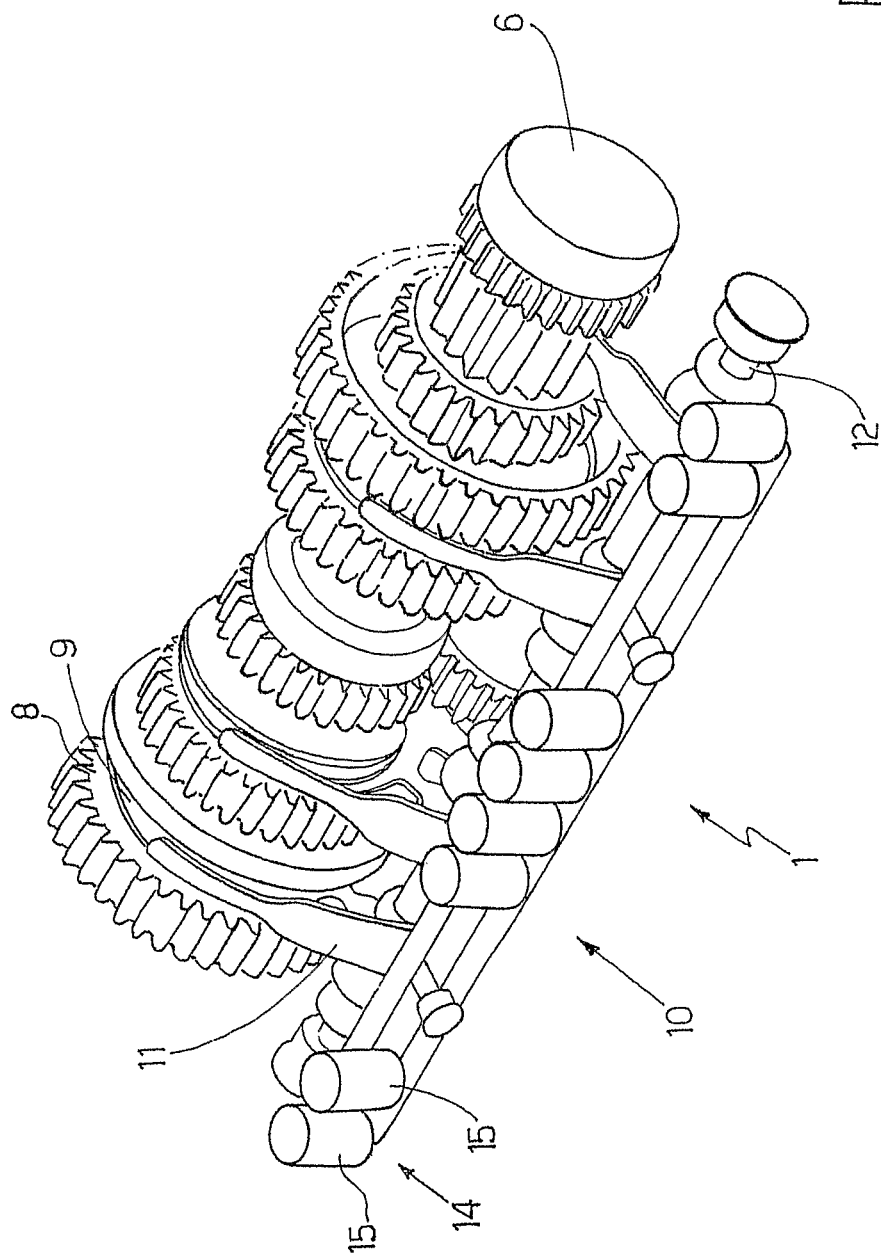
FIG. 2 is a perspective, diagrammatic view, with further parts removed for clarity, of the mechanical gearbox in FIG. 1.

As shown in FIG. 2, the mechanical gearbox 1 comprises a primary shaft 5 which receives the motion from the thermal engine and a secondary shaft 6 which transmits the motion to the drive wheels of the vehicle. The primary shaft 5 and the secondary shaft 6 are reciprocally and mechanically coupled by means of a plurality of gear pairs, each of which defines a corresponding speed and a comprises a primary gear 7 coaxially mounted on the primary shaft 5 and a secondary gear 8 coaxially mounted on the secondary shaft 6.

In each gear pair which defines a corresponding speed, the primary gear 7 permanently meshes which the corresponding secondary gear 8; furthermore, in each gear pair, a gear 7 or 8 is rigidly mounted onto its shaft 5 or 6, while the other gear 8 or 7 is idly mounted onto its shaft 6 or 5 and coupled to a synchronizer 9 adapted to be actuated to engage the other gear 8 or 7 itself to its shaft 6 or 5 (i.e. to make the gear 8 or 7 integral with the shaft 6 or 5). Consequently, a plurality of synchronizers 9 are contemplated, each of which is arranged coaxially to a corresponding shaft 6 or 5 between two gears 8 or 7 and is adapted to be actuated in order to alternatively engage the two gears 8 or 7 to the corresponding shaft 6 or 5 (i.e. to make the gears 8 or 7 angular integral with the shaft 6 or 5). In other words, each synchronizer 9 may be displaced either in one sense (i.e., an operational state) to engage a gear 8 or 7 onto the corresponding shaft 6 or 5, or may be displaced in the other sense to engage the other gear 8 or 7 onto the shaft 6 or 5.

It is worth noting that the synchronizers 9 either may all be mounted coaxially to the primary shaft (i.e. all the primary gears 7 are idly mounted on the primary shaft 5 and are alternatively engaged onto the primary shaft 5 by the synchronizers 9), or may all be mounted coaxially to the secondary shaft 6 (i.e. all the secondary gears 8 are idly mounted on the secondary shaft 6 and are alternatively engaged onto the secondary shaft 6 by the synchronizers 9), or may be mounted coaxially either to the primary shaft 5 or to the secondary shaft 6 (i.e. some primary gears 7 are idly mounted on the primary shaft 5 and some secondary gears 8 are idly mounted on the secondary shaft 6).

The mechanical gearbox 1 comprises an actuation system 10, which is adapted to displace each synchronizer 9 alternatively in the two senses along the corresponding shaft 6 or 5. The actuation system 10 comprises a plurality of forks 11, each of which envelops a corresponding synchronizer 9 in order to push the synchronizer 9 itself in the two directions along the corresponding shaft 6 or 5.

Figure 3:
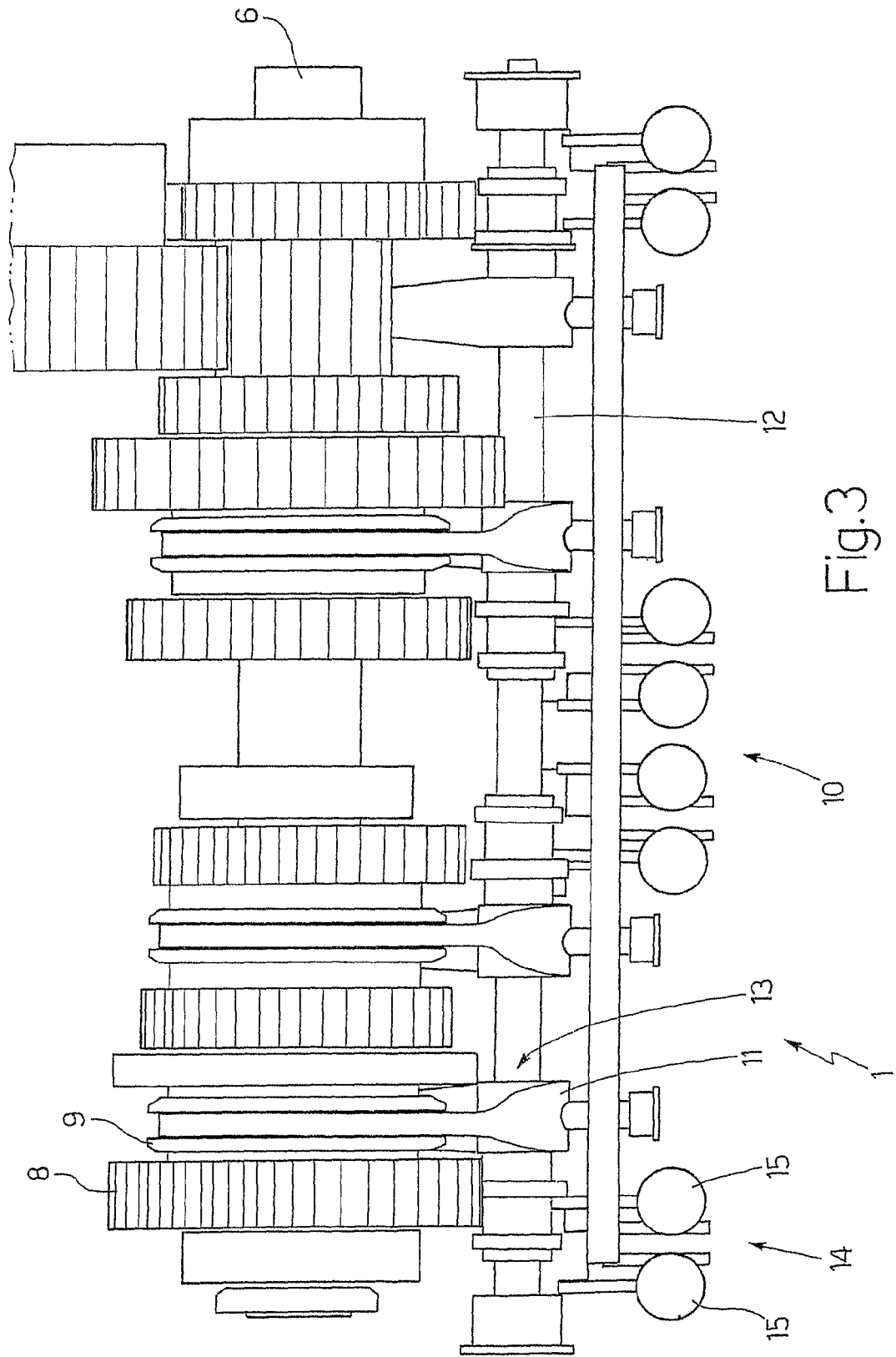
FIG. 3 is a diagrammatic, plan view, with further parts removed for clarity, of the mechanical gearbox in FIG. 1.
Figure 4:
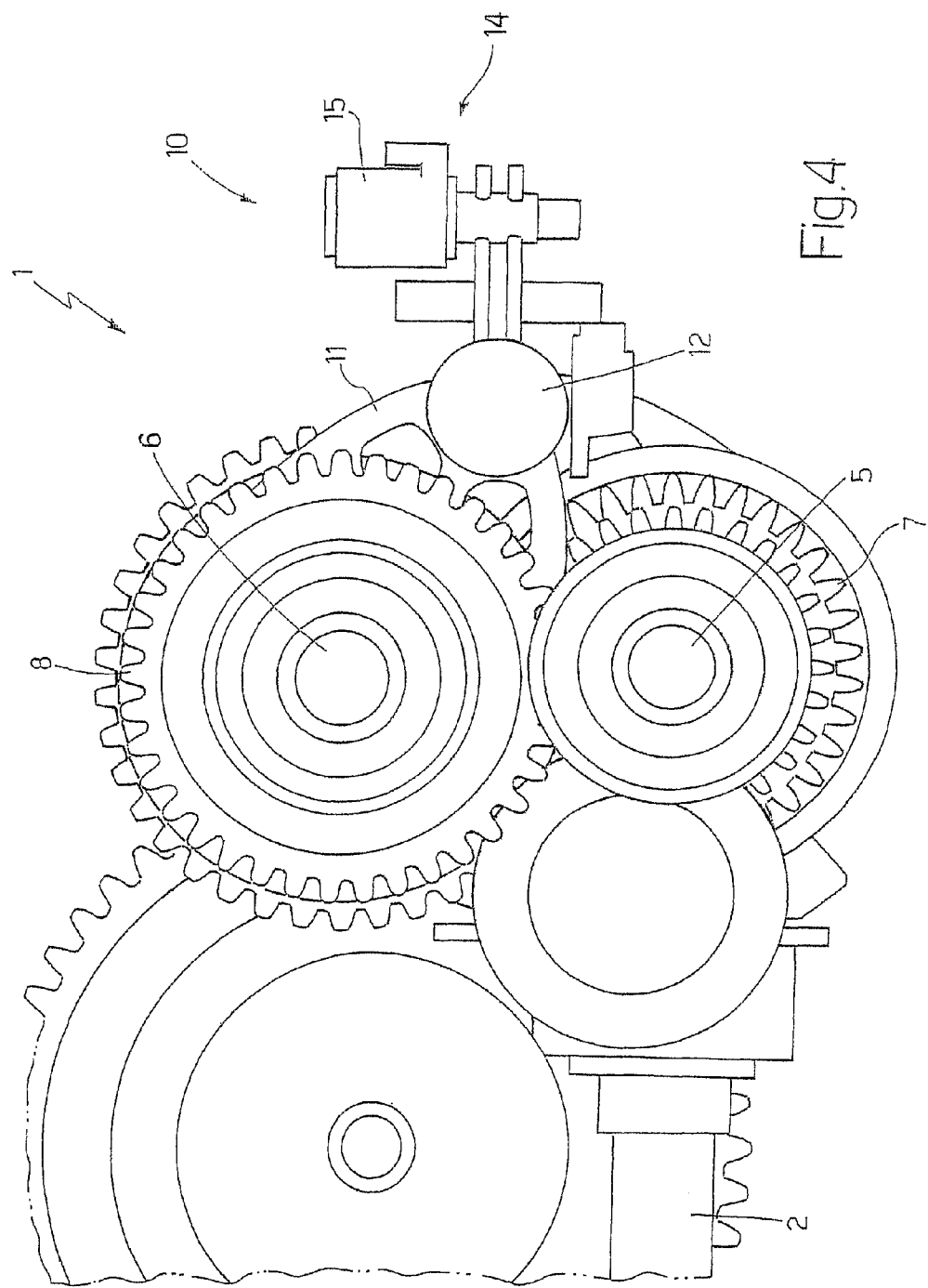
FIG. 4 is a side, diagrammatic view, with further parts removed for clarity, of the mechanical gearbox in FIG. 1.

As shown in FIG. 2-4, the actuation system 10 comprises a rod 12 parallel to and by the side of the secondary shaft 6 and supporting the forks 11, each of which presents a eyelet 13 slidingly fitted along the rod 12. Furthermore, the actuation system 10 comprises for each fork 11 an electric actuator 14 adapted to displace the fork 11 along the rod 12. In the embodiment shown in the accompanying figures, each electric actuator 14 comprises a pair of solenoids 15 each of which displaces the fork 11 in a corresponding direction. In a different embodiment (not shown), each electric actuator 14 comprises a single solenoid 15 which is adapted to produce a displacement in a single direction and a further common solenoid is contemplated which varies the sense of application of such a displacement to the forks 11; in other words, the common solenoid determines the direction of the displacement of the forks 11.

In the mechanical gearbox 1, the gear pairs of two consecutive speeds are arranged so as to be engaged by two different synchronizers 9; in other words, the gear pairs of two consecutive speeds (e.g. I and II, II and III, III and IV, or IV and V, etc.) are actuated by two different synchronizers 9. For example, the following gear pair combinations may be contemplated in which the gear pairs are engaged by a same synchronizer 9: R and II, I and III, V and VII, IV and VI.

During a gear shift from a current speed to a subsequent speed consecutive to the current speed, the actuation system 10 actuates, in reciprocally independent manner, the synchronizers 9 of the gear 8 or 7 of the current speed and of the gear 8 or 7 of the subsequent speed; in this manner, during a gear shift from a current speed to a subsequent speed consecutive to the current speed, the actuation system actuates the synchronizer 9 of the gear 8 or 7 of the current speed to disengage the gear 8 or 7 of the current speed itself from the shaft 6 or 5 and contemporarily actuates the synchronizer 9 of the gear 8 or 7 of the subsequent speed to engage the gear 8 or 7 of the subsequent speed itself onto the shaft 6 or 5.

In other words, while the synchronizer 9 of the gear 8 or 7 of the current speed is actuated to disengage the gear 8 or 7 of the current speed itself from the shaft 6 or 5, the synchronizer 9 of the gear 8 or 7 of the subsequent speed is actuated to engage the gear 8 or 7 of the subsequent speed itself onto the shaft 6 or 5; in this manner, the current speed disengagement operation (i.e. disengagement of the gear 8 or 7 of the current speed from the shaft 6 or 5) and subsequent speed engagement operation (i.e. engagement of the gear 8 or 7 of the subsequent speed onto the shaft 6 or 5) are contemporarily performed with a evident reduction of the total gear shift operation time. The contemporaneousness of the current speed disengagement operation and of the subsequent speed engagement operation may be adjusted (i.e. increased or decreased) with appropriate advances or delays in order to reduce the gear shift times in favor of sportiness and to the detriment of comfort, or vice versa. In other words, for an extremely fast (thus very sporty and potentially not very comfortable) gear shift, the current speed disengagement operation and of the subsequent speed engagement operation may be completely contemporary; in this situation, it may occur that for a certain period of time (normally very short) both the gears are engaged with consequent scraping to the detriment of comfort (the scraping is very noisy and may cause longitudinal vibrations on the vehicle). Instead, for a slower (thus less sportier but more comfortable) gear shift, the contemporaneousness of the current speed disengagement operation and of the subsequent speed engagement operation may be reduced (i.e. the engagement of the subsequent speed is delayed with respect to the disengagement of the current speed); in this situation, it is very likely that for a period range of time (normally short) both the gears are disengaged.

The contemporaneousness of the current speed disengagement operation and of the subsequent speed engagement operation is made possible by the fact that the gear pairs of two consecutive speeds are arranged so as to be engaged by two different synchronizers 9 and that the actuation system 10 allows to actuate the synchronizers 9 in reciprocally independent manner.

Figure 5:
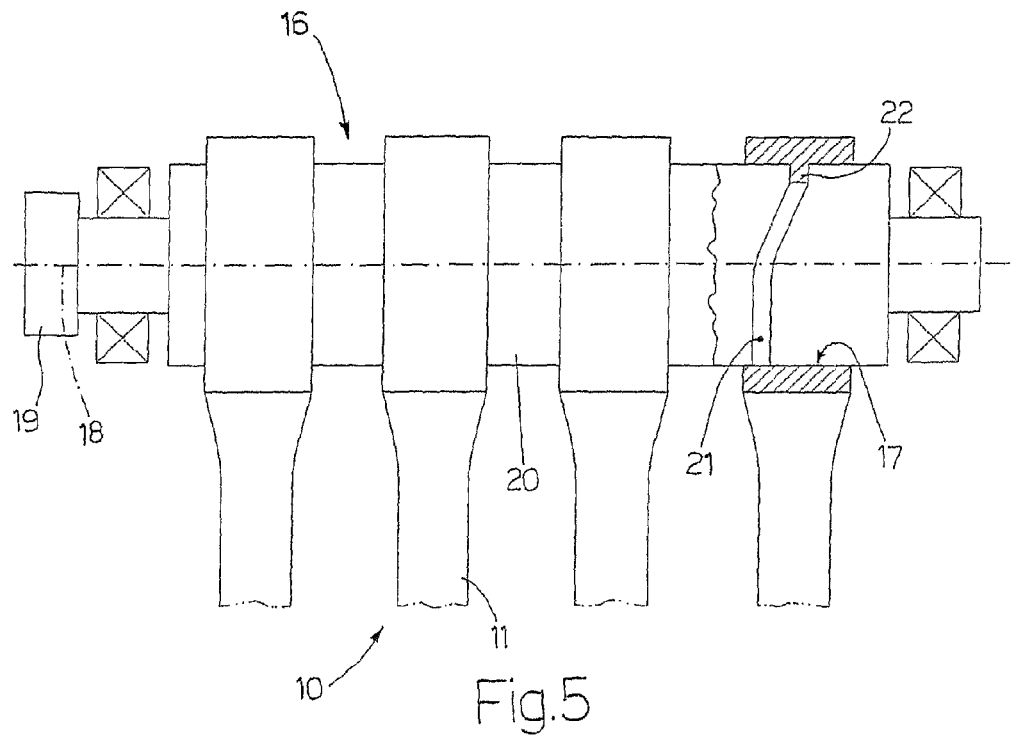
FIG. 5 is a plan, diagrammatic view, with parts removed for clarity, of a different embodiment of the mechanical gearbox in FIG. 1.

According to the embodiment shown in FIG. 5, the actuation system 10 does not contemplate the rod 12 nor the electric actuators 14, but comprises a shaft 16 parallel to and by the side of the primary shaft 5 and the secondary shaft 6 and supporting the forks 11, each of which presents an eyelet 17 slidingly fitted along the shaft 16. The shaft 16 turns about a central rotation axis 18 under the bias of a motor device 19 which may comprise an electronically electric motor or may comprise a mechanical transmission which receives motion from a lever manually moved by a driver. A plurality of circumferential cams 21 are obtained on the external surface 20 of the shaft 16, each of which is associated to a corresponding fork 11. Furthermore, each fork 11 is provided with a follower 22 which is integral with an eyelet 17 of the fork 11 and is inserted inside the cam 21 associated to the fork 11.

The rotation of the shaft 16 about the rotation shaft 18 determines an axial displacement of the forks 11 along the rotation axis 18 depending on the shape of the cams 21 and on the type of coupling between the follower 22 integral with the forks and the cams 21 themselves. The cams 21 are shaped so that a series of determined angular positions are defined along the round angle, at each of which a corresponding speed is engaged; furthermore, the cams 21 are shaped so that when passing from one determined angular position (i.e. from a current gear) to another determined angular position (i.e. to the subsequent gear) the current gear and the subsequent gear are respectively disengaged and engaged at the same time as shown above.

Figure 6:
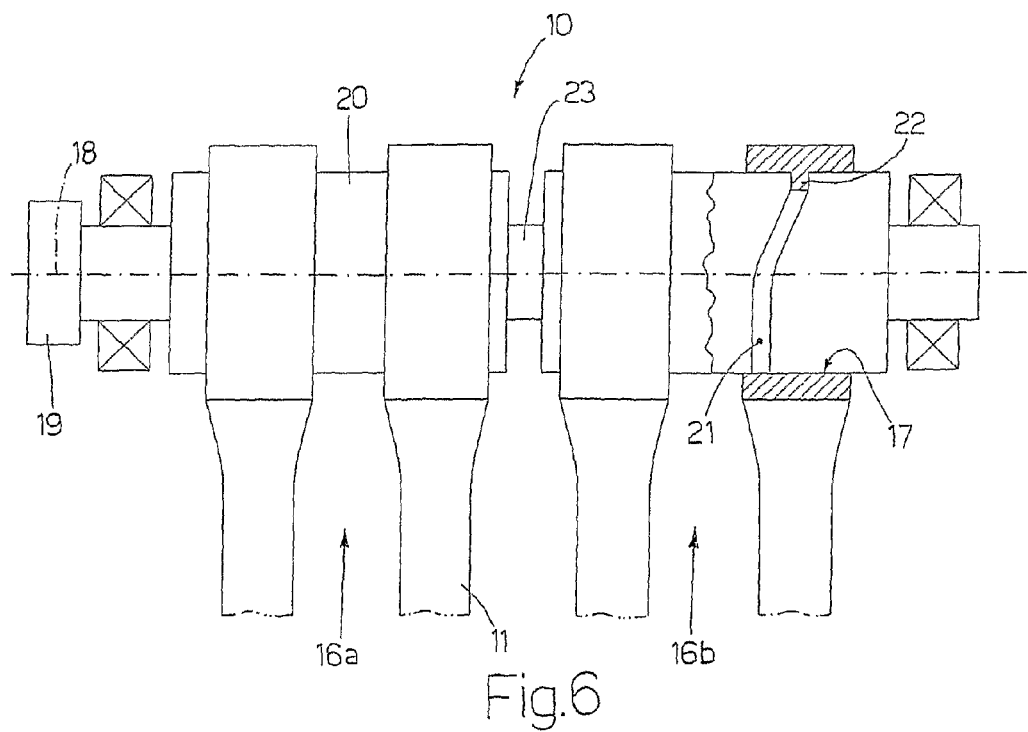
FIG. 6 is a plan, diagrammatic view, with parts removed for clarity, of a variant of the mechanical gearbox in FIG. 5.

According to a variant shown in FIG. 6, the shaft 16 is divided into two halves 16a and 16b, which are reciprocally independent, interconnected by means of an elastic connection element 23 and each of which supports a part of the forks 11.

The above-described mechanical gearbox 1 presents many advantages, because it is simple and cost-effective to make and above all allows to shift very quickly between two consecutive speeds.

The invention claimed is:

1. A mechanical gearbox for a motor vehicle; the gearbox comprises:
   a first shaft;
   a second shaft;
   a plurality of gear pairs, each of which mechanically couples the first shaft to the second shaft, defines a corresponding speed and comprises a first gear mounted on the first shaft and a second gear which is mounted on the second shaft and permanently meshes with the first gear;
   a plurality of synchronizers, each of which is mounted coaxially to the respective first or second shaft between two gears of two gear pairs and is adapted to be actuated to alternatively engage the two gears to the shaft, wherein for all the speeds the gear pairs of two consecutive speeds are engaged by two different synchronizers of the plurality of synchronizers; and
   a motorized actuation system adapted to displace each synchronizer alternatively, in two operational states, along the respective shaft, the system comprising a plurality of forks, each of which envelops a respective synchronizer, wherein the actuation system is to independently actuate the synchronizers so that each synchronizer is actuated independently from the other synchronizers, the actuation system comprising:
   a third shaft parallel to and by the side of the first and second shaft and supporting the forks, each of which presents an eyelet slidingly fitted along the third shaft;
   a plurality of circumferential cams, each of which is obtained on an external surface of the third shaft and is associated to the corresponding fork;
   a plurality of followers, each of which is integral with the eyelet of the respective fork and is inserted in the cam associated to the fork thereof; and
   a motor, which is adapted to turn the third shaft about a central rotation axis thereof;
   wherein the third shaft is split into two halves that are connected together by means of an elastic element and each of which supports a part of the forks.

2. A mechanical gearbox according to claim 1, wherein the motor is electric.

3. A mechanical gearbox for a motor vehicle, the gearbox comprising:
   only one primary shaft;
   only one secondary shaft adapted to transmit the motion to drive wheels;
   only one single clutch that is connected to the primary shaft and is adapted to receive the motion from a crankshaft of a thermal engine;
   a plurality of gear pairs, each of which mechanically couples the primary shaft to the secondary shaft, defines a corresponding speed and comprises a first gear mounted on the primary shaft and a second gear mounted on the secondary shaft permanently meshed with the first gear;
   a plurality of synchronizers, each of which is mounted coaxially to a respective one of the primary and secondary shaft between two gears of two gear pairs and is adapted to be actuated by a motorized actuation system to alternatively engage the two gears to the shaft, wherein for all the speeds the gear pairs of two consecutive speeds are engaged by two different synchronizers of the plurality of synchronizers; and
   a plurality of forks, each of which envelops a respective synchronizer, the plurality of forks to displace each synchronizer of the plurality of synchronizers alternatively, in two operational states, along its respective shaft, wherein the motorized actuation system is to actuate the plurality of forks/synchronizers in reciprocally independent manner so that each fork/synchronizer is actuated independently from the other forks/synchronizers,
   wherein the forks, during a gear shift from each current speed to a subsequent speed consecutive to the current speed, actuate the synchronizer of the gear of the current speed to disengage the first gear of the current speed from the primary shaft and contemporarily actuate the synchronizer of the gear of the subsequent speed to engage the gear of the subsequent speed onto the corresponding shaft;
   wherein the actuation system comprises:
      a third shaft parallel to and by the side of the primary and secondary shaft and supporting the forks, each of which presents an eyelet slidingly fitted along the third shaft, wherein the third shaft is split into two halves that are connected together by an elastic element and each of which supports a part of the forks;
      a plurality of circumferential cams, each of which is obtained on an external surface of the third shaft and is associated to the corresponding fork;
      a plurality of followers, each of which is integral with the eyelet of the respective fork and is inserted in the cam associated to the fork thereof; and
      a motor adapted to turn the third shaft about a central rotation axis thereof.

4. A mechanical gearbox according to claim 3, comprising a rod parallel to and by the side of the secondary shaft and supporting the forks, each of which presents an eyelet slidingly fitted along the rod.

5. A mechanical gearbox according to claim 4, wherein the actuation system comprises for each fork an electric actuator adapted to displace the fork along the rod.

6. A mechanical gearbox according to claim 3, wherein the motor is electric.

7. A mechanical gearbox according to claim 3, wherein the contemporaneousness of the current speed disengagement operation and of the subsequent speed engagement operation is adjusted with appropriate advances or delays in order to reduce the gear shift times in.

8. A mechanical gearbox according to claim 7, wherein to minimize the gear shift times the current speed disengagement operation and the subsequent speed engagement operation are completely contemporary.

9. A mechanical gearbox according to claim 7, wherein for a comfortable gear shift the contemporaneousness of the current speed disengagement operation and of the subsequent speed engagement operation is reduced by delaying the engagement of the subsequent speed with respect to the disengagement of the current speed.

10. A mechanical gearbox according to claim 9, wherein, by delaying the engagement of the subsequent speed with respect to the disengagement of the current speed, both the gears are disengaged for a period range of time.

\* \* \* \* \*

UNITED STATES PATENT AND TRADEMARK OFFICE
CERTIFICATE OF CORRECTION

PATENT NO. : 8,677,846 B2  Page 1 of 1
APPLICATION NO. : 12/668620
DATED : March 25, 2014
INVENTOR(S) : Roncaglia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Twenty-ninth Day of September, 2015

Michelle K. Lee
*Director of the United States Patent and Trademark Office*